(12) United States Patent
Hooker et al.

(10) Patent No.: US 8,466,656 B2
(45) Date of Patent: Jun. 18, 2013

(54) CHARGING DEVICES AND METHODS FOR CHARGING ELECTRICALLY POWERED VEHICLES

(75) Inventors: John Kenneth Hooker, Louisville, KY (US); Scott Jeffrey Hall, Louisville, KY (US); Denis Alagic, Louisville, KY (US); Prerana Gajanan Kulkarni, Sellersburg, IN (US); Cecilia Maria Thomas, Shepherdsville, KY (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 13/229,315

(22) Filed: Sep. 9, 2011

(65) Prior Publication Data
US 2012/0098487 A1 Apr. 26, 2012

(51) Int. Cl.
*H02J 7/00* (2006.01)
(52) U.S. Cl.
USPC ............... 320/109; 320/162; 320/164
(58) Field of Classification Search
USPC .......................................... 320/109
See application file for complete search history.

(56) References Cited

U.S. PATENT DOCUMENTS

| 4,220,909 | A | * | 9/1980 | Piteo ................................ 322/94 |
| 7,688,024 | B2 | | 3/2010 | Kamaga |
| 2010/0268406 | A1 | | 10/2010 | Ito et al. |
| 2010/0299008 | A1 | | 11/2010 | Mitsutani |
| 2011/0029144 | A1 | | 2/2011 | Muller et al. |
| 2011/0031939 | A1 | * | 2/2011 | Funaba et al. ................ 320/166 |
| 2011/0057611 | A1 | | 3/2011 | Nakaso et al. |

FOREIGN PATENT DOCUMENTS

EP 2190102 A1 5/2010

\* cited by examiner

*Primary Examiner* — Edward Tso
*Assistant Examiner* — Johali Torres Ruiz
(74) *Attorney, Agent, or Firm* — Global Patent Operation

(57) ABSTRACT

Charging devices and methods for charging electrically powered vehicles are disclosed. One example charging device includes a processor configured to at least partially control a state voltage and a detection circuit coupled to the processor. The detection circuit includes an energy storage device and a discharge circuit coupled to the energy storage device. The energy storage device is configured to be charged by the state voltage. The discharge circuit is configured to discharge said energy storage device in response to a discharge command from said processor. The processor is configured to determine a charging state associated with the electrically powered vehicle based on a voltage across said energy storage device.

20 Claims, 3 Drawing Sheets

CHARGING DEVICES AND METHODS FOR CHARGING ELECTRICALLY POWERED VEHICLES

BACKGROUND OF THE INVENTION

The subject matter disclosed herein relates generally to communicating with at least one electrically powered vehicle and, more specifically, to charging devices and methods for use in communicating with at least one electrically powered vehicle.

Electrically powered vehicles, including electric vehicles and plug-in hybrid electric vehicles, include electric motors powered from energy storage devices, such as batteries. As electrically powered vehicles operate, the energy storage devices contained therein are depleted. The energy storage devices are commonly recharged at vehicle charging stations to enable further use of the vehicle. Such vehicle charging stations are designed to charge the energy storage device when connected to the vehicle. Prior to charging, the charging station and the vehicle often communicate to ensure that the vehicle is connected for safe and efficient charging of the energy storage devices. Charging stations include communication circuits therein to provide and/or participate in communication between the charging station and the vehicle.

BRIEF DESCRIPTION OF THE INVENTION

In one aspect, a charging device for charging at least one electrically powered vehicle is provided. The charging device includes a processor configured to at least partially control a state voltage and a detection circuit coupled to the processor. The detection circuit includes an energy storage device and a discharge circuit coupled to the energy storage device. The energy storage device is configured to be charged by the state voltage. The discharge circuit is configured to discharge said energy storage device in response to a discharge command from said processor. The processor is configured to determine a charging state associated with the electrically powered vehicle based on a voltage across said energy storage device.

In another aspect, a charging station for charging at least one electrically powered vehicle is provided. The charging station includes a power source and a charging device coupled to the power source. The charging circuit includes a processor and a detection circuit coupled to the processor. The detection circuit includes an energy storage device and a discharge circuit configured to discharge the energy storage device in response to a discharge command. The energy storage device is configured to be charged by a state voltage. The processor configured to determine a charging state associated with the electrically powered vehicle based on a voltage across the energy storage device. The charging device is configured to control energy transfer from the power source to the electrically powered vehicle based on the charging state associated with the electrically powered vehicle.

In yet another aspect, a method for charging at least one electrically powered vehicle is provided. The method includes charging an energy storage device of a charging device from a state voltage generated by at least one of the charging device and an electrically powered vehicle, determining, by a processor, a voltage at the energy storage device over a predetermined interval, and discharging the energy storage device at least once during the predetermined interval.

DETAILED DESCRIPTION OF THE INVENTION

In some embodiments, the term "electrically powered vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
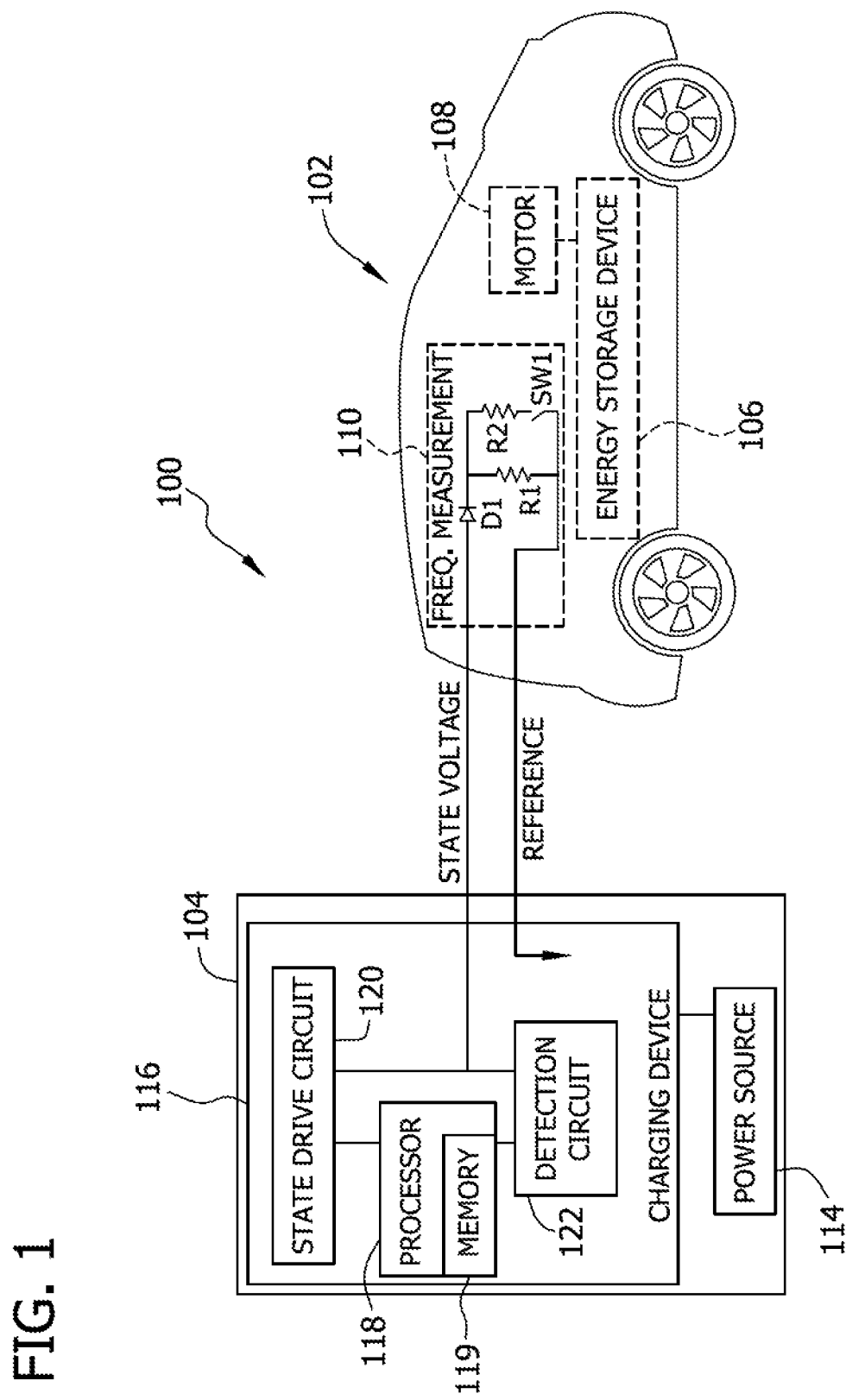
FIG. 1 is a block diagram of an exemplary system for charging an electrically powered vehicle.

FIG. 1 illustrates an exemplary system 100 for use in charging an electrically powered vehicle 102. In the exemplary embodiment, system 100 includes a charging station 104 coupled to electrically powered vehicle 102. Electrically powered vehicle 102 includes at least one energy storage device 106 coupled to motor 108. Energy storage device 106 may include, for example, one or more batteries, capacitors, inductors, etc. In the exemplary embodiment, electrically powered vehicle 102 includes a vehicle controller 110 coupled to energy storage device 106. Vehicle controller 110 communicates with charging station 104 and participates in control energy transfer from charging station 104 to energy storage device 106. In the exemplary embodiment, and described in detail below, vehicle controller 110 includes a diode D1, resistors R1 and R2, and a switching device SW1.

Electrically powered vehicle 102 is coupled to charging station 104 through a cable. Charging station 104 includes a power source 114 and a charging device 116 coupled to power source 114. As shown, charging device 116 includes a processor 118, a state drive circuit 120 coupled to processor 118, and a detection circuit 122 coupled to each of processor 118 and state drive circuit 120. Processor 118 includes a memory 119. While memory 119 is integrated with processor 118 in this example embodiment, memory 119 may be separate from processor 118 in other charging device embodiment.

In the exemplary embodiment, charging device 116 is configured to control energy transfer from power source 114 to electrically powered vehicle 102 based on a charging state associated with electrically powered vehicle 102. Prior to controlling energy transfer, charging device 116 determines the charging state associated with electrically powered vehicle 102 based on a state voltage provided between and affected by each of charging station 104 and electrically powered vehicle 102. More specifically, the state voltage is a voltage affected by charging device 116 and/or vehicle 102 to indicate the changing state associated with electrically powered vehicle 102. In the exemplary embodiment, detection circuit 122 detects the state voltage, and processor 118 determines the charging state associated with electrically powered vehicle 102 based on the detected state voltage. For example, if the detected state voltage is 12V, processor 118 is able to determine that powered vehicle 102 is disconnected from charging station 104. Alternatively, for example, if the detected state voltage is 6V, processor 118 is able to determine that powered vehicle 102 is connected and ready to accept energy. Further detail regarding state voltages is presented below.

Figure 2:
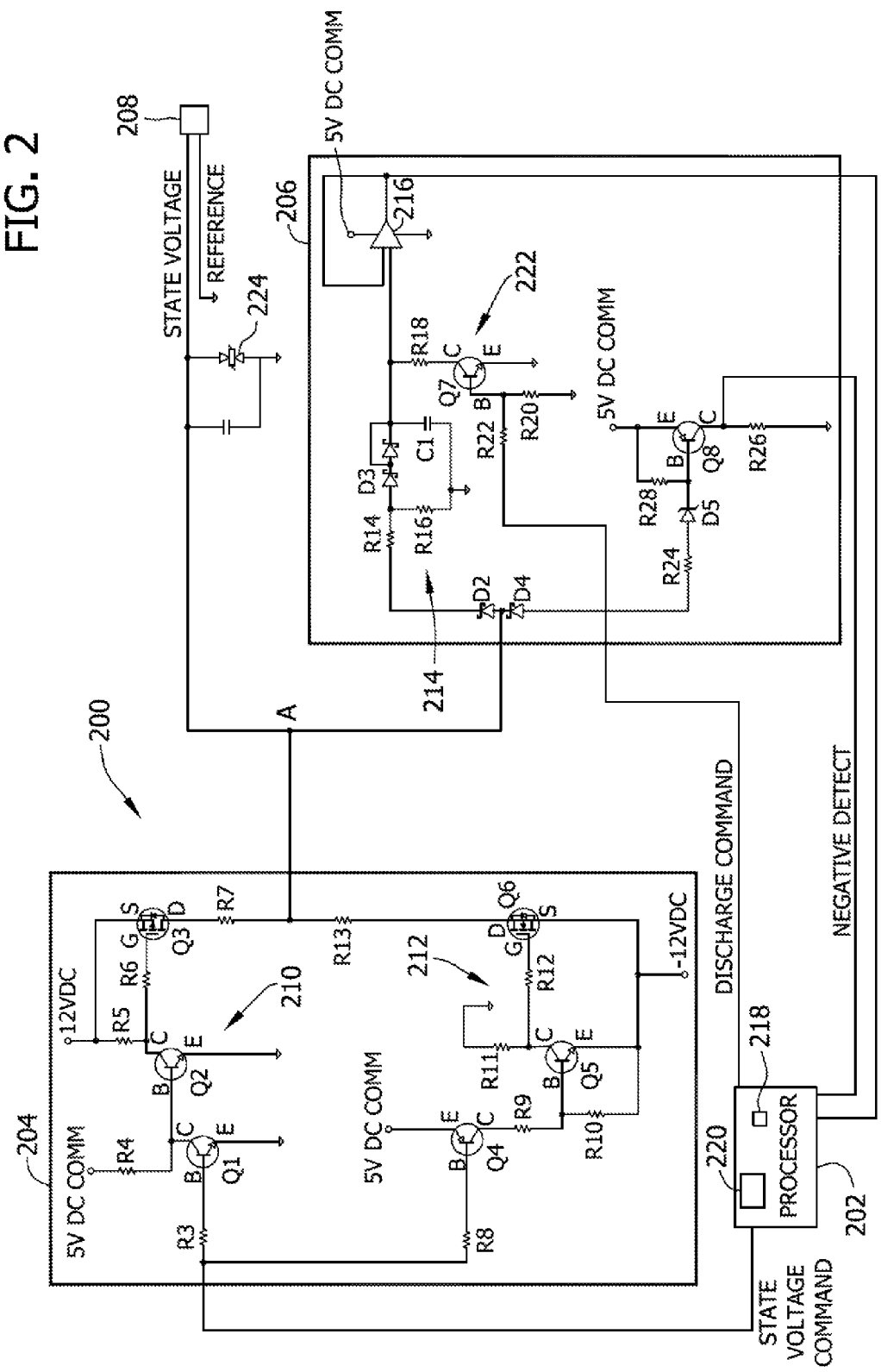
FIG. 2 is a block diagram of an exemplary charging device.

FIG. 2 illustrates a charging device 200 according to one exemplary embodiment of the present disclosure.

As shown, charging device 200 includes a processor 202, which may include, without limitation, a central processing unit (CPU), a microprocessor, a microcontroller, an application specific integrated circuit (ASIC), a programmable logic circuit (PLC), a field programmable gate array (FPGA) and/or any other circuit or processor capable of the methods and/or processes described herein.

In the exemplary embodiment, charging device 200 includes a state drive circuit 204 to provide a voltage to node A (potentially affected by vehicle controller 110) to provide the state voltage. In this example, state drive circuit 204 is configured to supply ±12V to node A. As shown, state drive circuit 204 includes a positive voltage branch 210 to supply +12V to node A and a negative voltage branch 212 to supply −12V to node A. As shown, in the exemplary embodiment, positive voltage branch 210 and negative voltage branch 212 are substantially balanced, such that the response time of each branch 210 and 212 to a state voltage command from processor 202 is substantially the same.

As illustrated, positive voltage branch 210 includes three switching device, transistors Q1, Q2, and Q3. Transistors Q1 and Q2 each include a base terminal B, an emitter terminal E and a collection terminal C. Transistor Q3 includes a gate terminal G, a drain terminal D and a source terminal S. As shown, state drive circuit 204 includes a resistor R3 coupled to base terminal B of transistor Q1. Emitter terminal E of transistors Q1 and Q2 are coupled to a reference. Collector terminal C of transistor Q1 is coupled to 5 VDC (i.e., a supply voltage) through resistor R4 and coupled to base terminal B of transistor Q1. Collector terminal C of transistor Q2 is coupled to 12 VDC through a resistor R5 and to gate terminal G of transistor Q3 through resistor R6. Source terminal S of transistor Q3 is coupled to 12 VDC, and drain terminal D of transistor Q3 is coupled to node A through resistor R7. In this exemplary embodiment, resistor R7 is a 1 kΩ resistor.

Further, negative voltage branch 212 includes three switching devices, including transistors Q4, Q5 and Q6. Transistors Q4 and Q5 each include a base terminal B, an emitter terminal E and a collection terminal C. Transistor Q6 includes a gate terminal G, a drain terminal D and a source terminal S. As shown, state drive circuit 204 includes a resistor R8 coupled to base terminal B of transistor Q4. Emitter terminal E of transistor Q4 is coupled to 5 VDC. Collector terminal C of transistor Q4 is coupled to base terminal B of transistor Q5 through resistor R9, which is coupled to −12 VDC through resistor R10. Further, emitter terminal E of transistor Q5 and source terminal S of transistor Q6 are coupled to −12 VDC. Collector terminal C of transistor Q5 is coupled to reference through resistor R11 and to gate terminal G of transistor Q6 through resistor R12. Drain terminal D of transistor Q6 is coupled to node A through resistor R13. In this exemplary embodiment, resistor R13 is a 1 kΩ resistor.

As illustrated, positive and negative voltage branches 210 and 212 each include multiple switching devices. While numerous switching devices are illustrated and described as being transistors herein, it should be appreciated that different switching devices (e.g., transistors, FETs, IGBTs, BJTs, SCRs diodes, or other switching circuits, etc.) and/or combinations thereof may be used in other charging device embodiments. In the exemplary embodiment, positive and negative voltage branches 210 and 212 each include multiple bipolar junction transistors (BJT) and one field effect transistor (FET). Specifically, positive voltage branch 210 includes two NPN BJTs Q1 and Q2, and negative voltage branch 212 includes one PNP BJT Q4 and one NPN BJT Q5. In the exemplary embodiment, state drive circuit 204 functions as described herein, without including one or more operational amplifiers. It should be appreciated that other state drive circuit embodiments may include different combinations of switching devices to provide one or more state voltages to node A.

Further, charging device 200 includes a detection circuit 206. In the exemplary embodiment, detection circuit 206 includes a diode D2, which is coupled to a voltage divider circuit 214 that includes resistors R14 and R16. Diode D3 is coupled between voltage divider circuit 214 and energy storage device C1. While energy storage device C1 is illustrated as a capacitor is this particular embodiment, it should be appreciated that other energy storage devices may be used in other detection circuit embodiments. Detection circuit 206 includes a switching a discharge circuit 222, which includes a switching device Q7. In the exemplary embodiment, switching device Q7 is a transistor Q7 having a base terminal B, an emitter terminal E and a collection terminal C. While switching device Q7 and other switching device included in the detection circuit 206 are illustrated and described as transistors, it should be appreciated that one or more different switching device may be employed in other detection circuit embodiments. Referring again to FIG. 2, emitter terminal E of transistor Q7 is coupled to the reference. Collector terminal C of transistor Q7 is coupled to energy storage device C1 through resistor R14, such that the series combination of resistor R18 and transistor Q7 is coupled in parallel with energy storage device C1. Base terminal B of transistor Q7 is coupled to reference through resistor R20 and to processor 202 through resistor R22.

As shown in FIG. 2, detection circuit 206 includes a resistor R16 coupled to node A through diode D2. Resistor R24 is coupled to a base terminal of a transistor Q8 through a diode D5. A collector terminal C of transistor Q8 is coupled to processor 202 and to reference through resistor R26. An emitter terminal E of transistor Q8 is coupled to 5 VDC, and emitter terminal E and base terminal B of transistor Q8 are coupled together through resistor R28. As shown, transistors Q7 and Q8 are BJTs, diodes D2-D4 are Schottky diodes, and D5 is a 15V Zener diode. Specifically, transistor Q7 is a NPN BJT, and transistor Q8 is a PNP BJT. It is contemplated that other types of transistors and/or diodes may be used in other detection circuit embodiments suitable to perform the processes and/or methods described herein.

In the exemplary embodiment, charging device 200 includes a connector 208 releasably coupled to electrically powered vehicle 102. More specifically, connector 208 provides a state voltage connection and a reference connection between charging device 200 and vehicle 102 (shown in FIG. 1). As should be apparent, additional connections between charging station 104 and vehicle 102 may be incorporated into connector 208 (or separate therefrom) for transferring energy therebetween. Further, in at least one embodiment, charging device 200 includes two connectors 208, such that charging device 200 is capable of receiving two distinct formats of cable/connector.

As illustrated, charging device 200 includes transient voltage suppression (TVS) device 224. TVS device 224 provides protection for voltage and/or current spikes at the state voltage connection to electrically powered vehicle 102. It should be appreciated that one or more different types of protection devices may be included in other embodiments. In at least one embodiment, TVS device 224 is omitted.

During operation, prior to vehicle 102 being coupled to charging station 104, processor 202 provides a state voltage command, which may be either high (e.g., 0V) or low (e.g., 5V), to state drive circuit 204. Absent a condition to provide a low state voltage command (e.g., an error, a failure, a test, etc.), processor 202 provides a high state voltage command. In response to the high state voltage command, transistor Q1 is turned OFF, which causes base terminal B of transistor Q2 to be pulled to 5 VDC, through resistor R4, thereby turning transistor Q2 ON. In turn, transistor Q3 is turned ON, coupling 12 VDC to node A. In this manner, state drive circuit 204 supplies +12V to node A through resistor R7.

With reference to detection circuit 206, because the state voltage at node A is 12V, diode D2 is turned ON, while diode D4 is OFF. The state voltage is supplied through diode D2 to voltage divider circuit 214 and divided between resistors R14 and R16 according to the resistances of each resistor. In this particular example, resistor R14 has a resistance of 100 kΩ and resistor R16 has a resistance of 51.1 kΩ. Accordingly, when +12V state voltage is supplied to voltage divider circuit 214, an output voltage of about +4.0V (i.e., the output voltage from voltage divider circuit 214) is supplied to energy storage device C1 (through diode D3). The output voltage supplied to energy storage device C1 charges energy storage device C1 up to about +4.0V. The voltage across energy storage device C1 is supplied to operational amplifier 216, which, in turn, buffers and outputs the voltage across energy storage device C1 to processor 202. In the exemplary embodiment, operational amplifier 216 is operating at unity gain to provide a voltage substantially equal to the voltage across energy storage device C1. In other embodiments, however, operational amplifier 216 amplifies and/or modifies the voltage across energy storage device C1 for one or more reasons, including, for example, signal integrity and/or operating characteristics of processor 202.

Processor 202 includes an analog-to-digital converter (ADC) 218 to receive the voltage across energy storage device C1 from operational amplifier 216. ADC 218 determines the capacitor voltage occasionally (e.g., periodically, randomly, etc.) during a predetermined interval. In this exemplary embodiment, ADC 218 determines the voltage across energy storage device C1 periodically, and the predetermined interval includes sufficient duration so that the voltage across energy storage device C1 accurately represents of the state voltage. In this exemplary embodiment, the predetermined interval is about 8.33 milliseconds, i.e., one half cycle at 60 Hz, during which the capacitor voltage is determined approximately 10-30 times. It should be appreciated, however, that a different number of samples and/or a different predetermined interval may be employed in other embodiments. Specifically, for example, the state voltage command from processor 202 may be a pulse-width modulated (PWM) signal, as described below, such that the state voltage at node A is not constant during a cycle. Accordingly, the number of samples during a predetermined interval and/or the duration of the predetermined interval are selected, such that energy storage device C1 is sufficiently charged to accurately detect the state voltage at various duty cycles (e.g., about 10% to about 90% duty cycle).

In the exemplary embodiment, processor 202 stores a first determined voltage in memory 220. Subsequently, processor 202 determines a second voltage and compares the second determined voltage to the first determined capacitor voltage stored in memory 220. If the second determined voltage is greater than the first determined voltage, the second determined voltage is stored in memory 220 (in place of the first determined voltage). Each determined voltage is compared to the stored voltage for the duration of the predetermined interval.

When the predetermined interval is complete, the determined voltage stored in memory 220 is determined to be the state voltage (adjusted for voltage divider circuit 214). In the exemplary embodiment, processor 202 determines the state voltage based on the largest voltage across energy storage device C1 determined during the predetermined interval. The stored voltage is about +4.0V in this example, which corresponds to a state voltage of +12V (supplied by state drive circuit 204). In this manner, processor 202 determines the state voltage based on detection circuit 206, which permits processor 202 to determine the charging state associated with electrically powered vehicle 102. In this particular example, processor 202 determines that vehicle 102 is disconnected from charging station 104 based on the +12V state voltage.

At least once during the predetermined interval (including at the start or end of the predetermined interval), processor 202 provides a discharge command to discharge circuit 222. In response to the discharge command, transistor Q7 is turned ON, which causes energy storage device C1 to be discharged through resistor R18 and transistor Q7. By occasionally discharging energy storage device C1, processor 202 limits the possibility of a change in the state voltage at node A, without a corresponding change to the voltage across energy storage device C1. Specifically, for example, if the state voltage at node A is reduced to reflect a state change in system 100, discharging energy storage device C1 clears energy storage device C1 so that energy storage device C1 is able to recharge up to the state voltage. It should be apparent that processor 202 may discharge energy storage device C1 regularly or irregularly during one or more predetermined intervals.

In the exemplary embodiment, when vehicle 102 is connected to charging station 104, diode D1 and resistor R1 are coupled to charging device 200. When the state voltage command is high, as described above, resistor R1 forms a voltage divider with resistor R7. The voltage divider reduces the state voltage at node A from +12V to +9V. In response, the voltage across energy storage device C1 is charged to about +3.0V, consistent with the description above. In turn, processor 202 determines the voltage across energy storage device C1 and determines the state voltage is about +9V. In turn, processor 202 determines that vehicle 102 is coupled to charging station 104, but not ready to accept energy.

Based on the +9V state voltage at node A, processor 202 performs a self-test to check whether vehicle 102 or some other device is connected. Specifically, in at least one self-test, processor 202 toggles the state voltage command to low, which causes transistors Q4 to be turned OFF. In turn, transistor Q5 turns OFF, and transistor Q3 is turned ON, which causes state drive circuit 204 to supply −12V to node A. At the same time, positive voltage branch 210 is turned OFF to stop supplying +12V to node A. Specifically, as illustrated in FIG. 2, positive voltage branch 210 and negative voltage branch 212 are substantially balanced. In such an embodiment, response times for each of positive and negative branches 210 and 212 to toggling of the state voltage command (from processor 202) are substantially the same. As a result, the potential for supplying both +12V and −12V to node A is diminished. In this exemplary embodiment, separate resistors R7 and R13 reduces and/or eliminates negative effects of short durations (e.g., <1 microsecond) periods where transistors Q3 and Q6 might both be ON due to one or more imbalances in the turn-ON and/or turn-OFF times.

As shown in FIG. 1, vehicle controller 110 includes diode D1, which blocks the −12V state voltage at node A. Accordingly, resistor R1 is not permitted to behave as a voltage divider with resistor R13. As a result, the −12V state voltage supplied by state drive circuit 204 remains −12V, despite being coupled to vehicle 102. In response to the −12V state voltage, Zener diode D2 is turned OFF, preventing the −12V state voltage from affecting energy storage device C1. Diode D4, however, is turned ON, which causes transistor Q8 to be turned ON through resistors R24 and Zener diode D5. As a result, transistor Q8 supplies a −12V detect signal to processor 202. Processor 202, in turn, receives the −12V detect signal and confirms that the −12V test is passed. Conversely, if the −12V detect is not received, processor 202 recognizes a fault condition, such as a device other than vehicle 102 is connected to charging station 104. In addition to the −12V detect test, the self-test may include one or more other tests, such as, without limitation, a ground fault test.

Once the self-test is passed, processor 202 provides a PWM state voltage command to initiate energy transfer from charging station 104 to vehicle 102. In the exemplary embodiment, PWM state voltage command oscillates at 1 kHz. When energy transfer is initiated, vehicle controller 110 closes switch SW1 to couple resistor R1 in parallel with resistor R3. The parallel combination of resistors R1 and R2 performs as a voltage divider as described above. The resulting state voltage is either 6.0V, indicating vehicle 102 is connected and ready to receive energy without ventilation, or 3.0V, indicating vehicle 102 is connected and ready to receive energy with ventilation. As described above, detection circuit 206 detects the state voltage and processor 202 determines the charging state associated with electrically powered vehicle 102.

The duty cycle of the PWM state voltage command from processor 202 defines the amount of energy that may be drawn from charging station 104. In one example, the duty cycle multiplied by 0.6 provides the amount of current that may be drawn from charging station 104 (e.g., 50% duty cycle×0.6=30 amps). As should be apparent, processor 202 outputs the state voltage command defining a duty cycle in ranges from 0% up to 100%, or more particularly, from 10% up to 90%. When the duty cycle of state voltage command is 10%, the state voltage (indicating the charging state associated with electrically powered vehicle 102) is supplied to node A for about 10% a predetermined interval. In such an embodiment, several oscillations of state voltage command from processor 202 may occur before energy storage device C1 is charged to the state voltage, as described above. Accordingly, in several embodiments, the predetermined interval, sampling times, and/or discharge command may be selected based on the operating conditions of charging station 104 and/or vehicle 102 to inhibit inaccurate charging and/or determining of the voltage at energy storage device C1.

Figure 3:
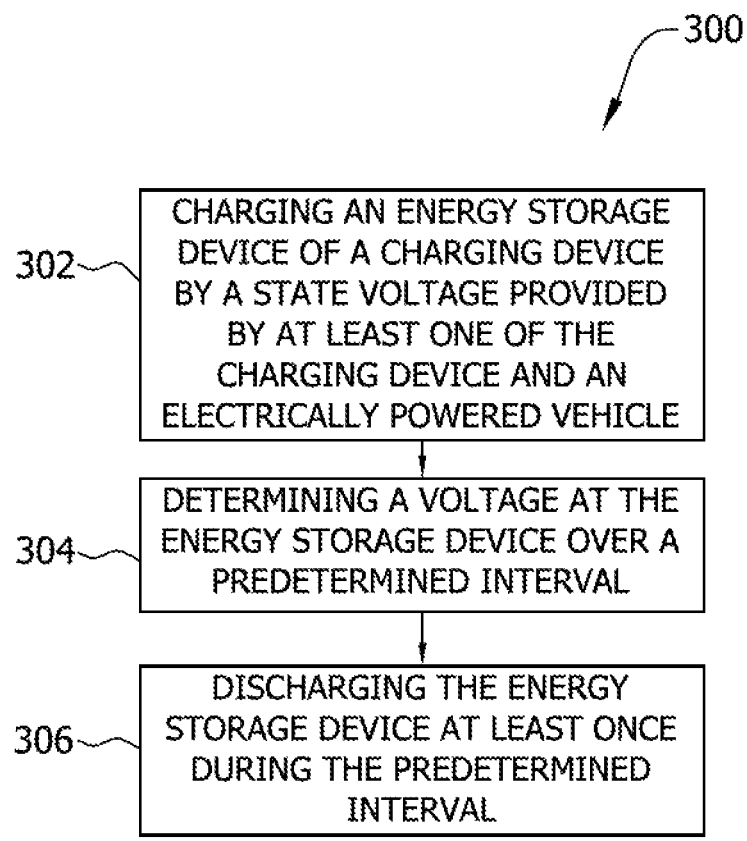
FIG. 3 is a block diagram of an exemplary method for use in communicating with at least one electrically powered vehicle.

FIG. 3 illustrates an exemplary method 300 for use in communicating with electrically powered vehicle 102. While method 300 is described with reference to system 100 and charging device 200, it should be appreciated that method 300 is not limited to the exemplary embodiments of FIGS. 1 and 2, but may be employed with other systems or devices. Likewise, system 100 and charging device 200 may perform other processes and/or methods consistent with the description above.

Method 300 includes charging 302 energy storage device C1 of charging device 116 by a state voltage provided by at least one of charging device 116 and electrically powered vehicle 102, determining 304, by processor 118, a voltage across energy storage device C1 over a predetermined interval, and discharging 306 energy storage device C1 at least once during the predetermined interval. In some embodiments, method 300 includes comparing a first determined voltage to a second determined voltage, storing the greater of the first and second determined voltages in memory 220, and determining a charging state associated with electrically powered vehicle 102 based on the stored voltage. Additionally, or alternatively, method 300 includes blocking the state voltage from charging energy storage device C1 when the state voltage is negative.

The present disclosure contemplates a need for an effective charging device to provide efficient and safe communication between a charging station and an electrically powered vehicle, while being responsive to rapid changes in charging state. The charging device embodiments described herein provide accordingly. For example, charging device embodiments herein may provide effective communication between a charging station and electrically powered vehicle, which provides improved efficiency and safety, as compared to known charging station circuits. Further, the charging device embodiments herein may provide improved response to changes in the charging state, potentially based on the occasionally detecting of voltage across an energy storage device that is charged by charging by the state voltage and/or discharging the same energy storage device. Moreover, the charging device embodiments described herein may provide cost savings, over known charging station circuits. The charging device embodiments described herein may be fabricated using general off-the-shelf components, to omit or reduce the number of specific, higher performance and more costly components. In one example, a charging device employing one or more aspects described herein may avoid use of high speed, high output operational amplifiers, as used in known charging station circuits.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charging device for charging at least one electrically powered vehicle, said charging device comprising:
   a processor positioned remotely from the at least one electrically powered vehicle, said processor configured to at least partially control a state voltage; and
   a detection circuit positioned remotely from the at least one electrically powered vehicle and coupled to said processor, said detection circuit including an energy storage device and a discharge circuit coupled to said energy storage device, said energy storage device configured to be charged by the state voltage, said discharge circuit configured to discharge said energy storage device in response to a discharge command from said processor;
   wherein said processor is configured to determine a charging state associated with the electrically powered vehicle based on a voltage across said energy storage device.

2. The charging device of claim 1, wherein said discharge circuit comprises a series combination of a resistor and a switching device coupled in parallel with said energy storage device to discharge said energy storage device upon receiving the discharge command.

3. The charging device of claim 1, wherein said detection circuit comprises a voltage divider circuit coupled to said energy storage device, wherein said voltage divider circuit is configured to provide an output voltage based on the state voltage, and wherein said energy storage device is configured to be charged by the output voltage from said voltage divider circuit.

4. The charging device of claim 3, wherein said detection circuit comprises a diode coupled in series with said voltage divider circuit to substantially block the state voltage when the state voltage is negative.

5. The charging device of claim 1, wherein said detection circuit comprises a negative detect circuit configured to transmit a negative detect signal to said processor when the state voltage is negative.

6. The charging device of claim 1, wherein said processor comprises a memory, and wherein said processor is configured to occasionally determine the voltage across said energy storage device for a predetermined interval and store the determined voltages in said memory.

7. The charging device of claim 6, wherein said processor is configured to determine the charging state associated with the electrically powered vehicle based on the determined voltages stored in said memory.

8. The charging device of claim 6, wherein said processor is configured to transmit the discharge command at least once during the predetermined interval.

9. The charging device of claim 1, further comprising a state drive circuit coupled to said processor, wherein said processor is configured to provide a state voltage command, and wherein said state drive circuit is configured to supply the state voltage associated with the electrically powered vehicle based on the state voltage command from said processor.

10. The charging device of claim 9, wherein said state drive circuit comprises a positive voltage branch configured to supply a positive voltage as the state voltage associated with the electrically powered vehicle and a negative voltage branch configured to supply a negative voltage as the state voltage associated with the electrically powered vehicle.

11. The charging device of claim 10, wherein each of said voltage branches comprising at least one bipolar junction transistor (BJT) and at least one field effect transistor (FET).

12. The charging device of claim 11, wherein the positive voltage branch and negative voltage branch are substantially balanced.

13. The charging device of claim 1, wherein said detection circuit comprises an amplifier coupled between said energy storage device and said processor, said amplifier configured to supply the voltage across said energy storage device to said processor.

14. A charging station for charging at least one electrically powered vehicle, said charging station comprising:
a power source; and
a charging device positioned remotely from the at least one electrically powered vehicle and coupled to said power source, said charging device comprising a processor and a detection circuit coupled to said processor; said detection circuit including an energy storage device and a discharge circuit configured to discharge said energy storage device in response to a discharge command, said energy storage device configured to be charged by a state voltage, said processor configured to determine a charging state associated with the electrically powered vehicle based on a voltage across said energy storage device;
wherein said charging device is configured to control energy transfer from the power source to the electrically powered vehicle based on the charging state associated with the electrically powered vehicle.

15. The charging station of claim 14, wherein said discharge circuit comprises a series combination of a resistor and a switching device coupled in parallel with said energy storage device to discharge said energy storage device upon receiving the discharge command.

16. The charging station of claim 15, wherein said detection circuit comprises a voltage divider circuit coupled to said energy storage device, wherein said voltage divider circuit is configured to provide an output voltage based on the state voltage, and wherein said energy storage device is configured to be charged by the output voltage from said voltage divider circuit.

17. The charging station of claim 14, wherein said processor comprises a memory, said processor configured to occasionally determine the voltage across said energy storage device for a predetermined interval and store the determined voltages in said memory, and wherein said processor is configured to determine the charging state associated with the electrically powered vehicle based on the determined voltages stored in said memory.

18. The charging station of claim 17, wherein said processor is configured to transmit the discharge command at least once during the predetermined interval.

19. The charging station of claim 17, further comprising a state drive circuit coupled to said processor, wherein said state drive circuit comprises a positive voltage branch configured to supply a positive voltage as the state voltage associated with the electrically powered vehicle and a negative voltage branch configured to supply a negative voltage as the state voltage associated with the electrically powered vehicle.

20. The charging station of claim 19, wherein each of said voltage branches comprising at least one bipolar junction transistor (BJT) and at least one field effect transistor (FET).

* * * * *